US012669071B2

(12) United States Patent
Katterbauer et al.

(10) Patent No.: US 12,669,071 B2
(45) Date of Patent: Jun. 30, 2026

(54) METHOD AND SYSTEM FOR MANAGING CARBON DIOXIDE SUPPLIES AND SUPERCRITICAL TURBINES USING MACHINE LEARNING

(71) Applicant: SAUDI ARABIAN OIL COMPANY, Dhahran (SA)

(72) Inventors: Klemens Katterbauer, Dhahran (SA); Abdulaziz S. Al-Qasim, Dammam (SA); Alberto F. Marsala, Venice (IT); Sara Abu Alsaud, Al Qatif (SA); Ali Abdallah Al Yousif, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1126 days.

(21) Appl. No.: 17/644,733

(22) Filed: Dec. 16, 2021

(65) Prior Publication Data

US 2023/0193791 A1 Jun. 22, 2023

(51) Int. Cl.
F01K 13/02 (2006.01)
E21B 43/16 (2006.01)
(Continued)

(52) U.S. Cl.
CPC ............ F01K 13/02 (2013.01); E21B 43/164 (2013.01); E21B 44/00 (2013.01); F01K 15/00 (2013.01);
(Continued)

(58) Field of Classification Search
CPC ........ F01K 13/02; F01K 15/00; F01K 25/103; E21B 43/164; E21B 44/00; E21B 2200/22; G05B 13/04; G06N 3/084; Y02P 90/84
See application file for complete search history.

(56) References Cited

U.S. PATENT DOCUMENTS 9,869,167 B2 * 1/2018 Randolph ............... F03G 4/026
10,378,324 B2 * 8/2019 Conn ................. G05B 13/0275
(Continued)

FOREIGN PATENT DOCUMENTS

CN 111119813 A 5/2020
CN 111119814 A 5/2020
(Continued)

OTHER PUBLICATIONS

Junyu You, William Ampomah, Qian Sun, Eusebius Junior Kutsienyo, Robert Scott Balch, Zhenxue Dai, Martha Cather, Xiaoying Zhang, Machine learning based co-optimization of carbon dioxide sequestration and oil recovery in CO2-EOR project, 2020, Journal of Cleaner Production, vol. 260, pp. 1-13 (Year: 2020).*
(Continued)

*Primary Examiner* — Emerson C Puente
*Assistant Examiner* — Emily Gorman Leathers
(74) *Attorney, Agent, or Firm* — Osha Bergman Watanabe & Burton LLP

(57) ABSTRACT

A method may include obtaining reservoir data for a geological region of interest. The method may further include obtaining turbine data regarding a supercritical carbon dioxide power (sCO2) turbine. The method may further include obtaining carbon emission data for a well coupled to the geological region of interest. The method may further include determining predicted production data and predicted carbon emission data using a machine-learning model, the reservoir data, the turbine data, and the carbon emission data. The method may further include transmitting a command to a control system based on the predicted production data and the predicted carbon emission data. The command may adjust an amount of carbon dioxide that is distributed to an injection well and the sCO2 turbine. The command
(Continued)

achieves a predetermined production rate at the well and a predetermined carbon footprint.

11 Claims, 5 Drawing Sheets

(51) Int. Cl.

| | |
|---|---|
| *E21B 44/00* | (2006.01) |
| *F01K 15/00* | (2006.01) |
| *F01K 25/10* | (2006.01) |
| *G05B 13/04* | (2006.01) |
| *G06N 3/084* | (2023.01) |

(52) U.S. Cl.
CPC ............ *F01K 25/103* (2013.01); *G05B 13/04* (2013.01); *G06N 3/084* (2013.01); *E21B 2200/22* (2020.05); *Y02P 90/84* (2015.11)

(56) References Cited

U.S. PATENT DOCUMENTS

| | | | | |
|---|---|---|---|---|
| 10,430,725 B2 * | 10/2019 | Anderson | .............. | G06N 20/00 |
| 10,655,542 B2 * | 5/2020 | Rittenhouse | ............ | F01D 19/02 |
| 11,428,078 B2 * | 8/2022 | Sun | ........................... | G06N 3/08 |
| 2009/0287520 A1 | 11/2009 | Zimmerman | | |
| 2010/0202264 A1 | 8/2010 | Han | | |
| 2011/0100002 A1 * | 5/2011 | Muir | ....................... | F03G 4/074 |
| | | | | 60/641.2 |
| 2012/0143382 A1 | 6/2012 | Lou | | |
| 2014/0182298 A1 | 7/2014 | Krull et al. | | |
| 2015/0204239 A1 | 7/2015 | Minto et al. | | |
| 2015/0226133 A1 | 8/2015 | Minto et al. | | |
| 2015/0377148 A1 * | 12/2015 | Minto | ....................... | F02C 9/22 |
| | | | | 60/39.52 |
| 2016/0010493 A1 | 1/2016 | O'Dea et al. | | |
| 2016/0154907 A1 | 6/2016 | Halabe et al. | | |
| 2016/0186658 A1 | 6/2016 | Vorel et al. | | |
| 2016/0201916 A1 | 7/2016 | Allen et al. | | |
| 2016/0298447 A1 | 10/2016 | Mohaghegh et al. | | |
| 2017/0242410 A1 | 8/2017 | Iyer et al. | | |
| 2018/0087360 A1 | 3/2018 | Conn et al. | | |
| 2018/0230778 A1 | 8/2018 | Thrash | | |
| 2019/0013756 A1 | 1/2019 | Huntington et al. | | |
| 2020/0372588 A1 * | 11/2020 | Shi | .......................... | G06N 20/00 |
| 2021/0040286 A1 | 2/2021 | Li et al. | | |
| 2021/0264262 A1 | 8/2021 | Colombo et al. | | |
| 2022/0228465 A1 * | 7/2022 | Madasu | ................ | E21B 43/122 |

FOREIGN PATENT DOCUMENTS

| | | | | | |
|---|---|---|---|---|---|
| CN | 112836349 A | | 5/2021 | | |
| CN | 112861423 A | | 5/2021 | | |
| CN | 113240155 A | | 8/2021 | | |
| EP | 2096257 A1 | | 9/2009 | | |
| GB | 2588322 A | | 4/2021 | | |
| KR | 20200057608 A | * | 8/2019 | | |
| NL | 2019056 B1 | * | 12/2018 | | |
| WO | WO-2011123193 A1 | * | 10/2011 | .............. | C10J 3/723 |
| WO | 2017188858 A1 | | 11/2017 | | |
| WO | WO-2018217686 A2 | * | 11/2018 | .............. | G06Q 10/04 |
| WO | 2019056870 A1 | | 3/2019 | | |
| WO | 2021002853 A1 | | 1/2021 | | |

OTHER PUBLICATIONS

Prasad Saripalli, James Amonette, Fred Rutz, Neeraj Gupta, Design of sensor networks for long term monitoring of geological sequestration, 2006, Energy Conversion and Management, vol. 47, Issues 13-14, pp. 1968-1974 (Year: 2006).*

StatSoft Inc. Neural Networks, 1984-1998, Webpage (https://www.uaq.mx/statsoft/stneunet.html) (Year: 1998).*

Abdelhamid Shalaby, Ali Elkamel, Peter L. Douglas, Qinqin Zhu,

Qipeng P. Zheng, A machine learning approach for modeling and optimization of a CO2 post-combustion capture unit, 2021, Energy, vol. 215, Part A (Year: 2021).*

Shaowei Pan, Jizhe Wang and Wei Zhou, Prediction on Production of Oil Well with Attention-CNN-LSTM, Oct. 13, 2021, Journal of Physics: Conference Series, vol. 2030, pp. 1-9. (Year: 2021).*

Yichuan Tang, Deep Learning using Support Vector Machines, 2013, CoRR, abs/1306.0239 2.1 (Year: 2013).*

US Department of Energy, "Supercritical Carbon Dioxide Brayton Cycle", 2015, Quadrennial Technology Review 2015, Chapter 4: Advancing Clean Electric Power Technologies—Technology Assessments (Year: 2015).*

Katterbauer, K., Marsala, A., Al Qasim, A., and Yousif, "Minimizing Carbon Footprint by Smart Sustainable Reservoir Management", Nov. 2021, SPE Middle East Oil & Gas Show and Conference (Year: 2021).*

Katterbauer, K., Al Sofi, A. Marsala, A., and Yousif, A., "An Innovative Artificial Intelligence Framework for Reducing Carbon Footprint in Reservoir Management", Sep. 2021, SPE Annual Technical Conference and Exhibition (Year: 2021).*

Q. Sun et al., "Practical Co2-WAG Field Operational Designs Using Hybrid Numerical-Machine-Learning Approaches", Energies, 2021, vol. 14, No. 4, 1055, pp. 1-26 (26 pages).

H. V. Thanh et al., "Application of artificial neural network for predicting the performance of CO2 enhanced oil recovery and storage in residual oil zones", Scientific Reports, 2020, vol. 10, No. 1, 18204 pp. 1-16, (16 pages).

A. Sircar et at., "Application of machine learning and artificial intelligence in oil and gas industry", Petroleum Research 2021, vol. 6, pp. 379-391 (13 pages).

S. Mishra et al., "Simplified Predictive Models for CO2 Sequestration Performance Assessment", Dec. 2015, U.S. Department of Energy National Energy Techonology Laboratory (102 pages).

Y. Zhang et al., Well placement and control optimization for WAG/SAG processes using ensemble-based method, Compputers & Chemical Engineering, 2017, vol. 101, pp. 193-209 (17 pages).

N. A. Menad et al., An efficient methodology for multi-objective optimization of water alternating CO2 EOR process, Journal of the Taiwan Institute of Chemical Engineers, 2019, vol. 99, pp. 154-165 (12 pages).

Z. Dai et al., An Integrated Framework for Optimizing CO2 Sequestration and Enhanced Oil Recovery, Enviromental Science & Techonogy Letter, 2014, vol. 1, No. 1, pp. 49-54 (6 pages).

Z. Chen et al., Estimating Carbon Dioxide (CO2) Emissions from Reservoirs Using Artificail Neural Networks, Water 2018, pp. 1-16 (16 pages).

A. Bonneville et al., Geologic Sequestration Software Suite (GS3): a collaborative approach to the management of geological GHG storage projects, Energy Procedia, 2011, vol. 4, pp. 3825-3832 (8 pages).

J. You et al., Machine learning based co-optimization of carbon dioxide sequestration and oil recovery in CO2-EOR project, Journal of Cleaner Production, 2020, vol. 260, 120866 (13 pages).

Office Action issued in corresponding U.S. Appl. No. 17/644,728, dated Feb. 23, 2023 (27 pages).

R. Masoomi et at., "Optimization of Enhanced Oil Recovery by I-WAG Injection at a Real Oil Field", Department of Petroleum Engineering, KubSTU, Russia[1], Islamic Azad University of Science and Research of Fars, Apr. 15, 2014 (6 pages).

H. N. A.K. Kenfack et al., "Data Improving in Time Series Using ARX and ANN Models", Marquette University e-Publications@Marquette, Sep. 1, 2017 (22 pages).

F. Christudas et al., "System Identification Using Long Short Term Memory Recurrent Neural Networks for Real Time Conical Tank System", Romanian Journal of Information Science and Technology, vol. 23, No. T, 2020, T57-T77 (21 pages).

R. F. Wright et al., "Corrosion Sensors for Structural Health Monitoring of Oil and Natural Gas Infrastructure: A Review", Sensors, 2019, vol. 19, No. 3964 (32 pages).

SwRI and GE design and operate the highest temperature sCO2

(56)            References Cited

OTHER PUBLICATIONS turbine in the world Published Apr. 8, 2019 https://www.swri.org/
press-release/swri-gehighest- temperature-sco2-turbine-world (4 pages).

* cited by examiner

METHOD AND SYSTEM FOR MANAGING CARBON DIOXIDE SUPPLIES AND SUPERCRITICAL TURBINES USING MACHINE LEARNING

BACKGROUND

Global climate change and air quality have become increasingly important environmental concerns. Various contributors to global climate change are greenhouse gases, which include carbon dioxide ($CO_2$), methane ($CH_4$), and nitrous oxide ($N_2O$). In particular, greenhouse gases may occur naturally and as the result of oil and gas production. For example, $CO_2$ emissions may result from well operations, such as exhaust from engines, turbines and fired heaters, gas flaring, well testing, and enhanced oil recovery (EOR) operations. However, some attempts have been made in the oil and gas industry to reduce the amount of greenhouse gases. In particular, some operations recycle and reuse waste gases to conserve heat or minimize flaring. Likewise, improved leak detection practices can also identify and fix gas leaks from tanks and other equipment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, reservoir data for a geological region of interest. The method further includes obtaining, by the computer processor, turbine data regarding one or more supercritical carbon dioxide power ($sCO_2$) turbines. The method further includes obtaining, by the computer processor, carbon emission data for one or more wells coupled to the geological region of interest. The method further includes determining, by the computer processor, predicted production data and predicted carbon emission data using a machine-learning model, the reservoir data, the turbine data, and the carbon emission data. The method further includes transmitting, by the computer processor, one or more commands to a control system based on the predicted production data and the predicted carbon emission data. The one or more commands adjusts an amount of carbon dioxide that is distributed to an injection well and the one or more $sCO_2$ turbines. The one or more commands achieve a predetermined production rate at the one or more wells and a predetermined carbon footprint. The predetermined carbon footprint corresponds to carbon emissions that are produced by the one or more wells and the one or more $sCO_2$ turbines.

In general, in one aspect, embodiments relate to a method that includes a first control system coupled to an injection well, a second control system coupled to a production well, and a third control system coupled to one or more supercritical carbon dioxide ($sCO_2$) turbines. The system further includes a carbon dioxide manager that includes a computer processor, where the carbon dioxide manager is coupled to the first control system, the second control system, and the third control system. The carbon dioxide manager obtains reservoir data for a geological region of interest coupled to the injection well and the production well. The carbon dioxide manager obtains turbine data regarding the one or more supercritical $sCO_2$ turbines. The carbon dioxide manager obtains carbon emission data for the injection well and the production well. The carbon dioxide manager determines predicted production data and predicted carbon emission data using a machine-learning model, the reservoir data, the turbine data, and the carbon emission data. The carbon dioxide manager transmits one or more commands to the first control system, the second control system, or the third control system based on the predicted production data and the predicted carbon emission data. The one or more commands achieve a predetermined production rate and a predetermined carbon footprint. The predetermined carbon footprint corresponds to carbon emissions that are produced by the production well, the injection well, and the one or more $sCO_2$ turbines.

In some embodiments, a machine-learning model includes a neural network that includes at least one hidden layer, at least one neuron, and an activation function, where the neural network determines a predicted production rate at a predetermined time for one or more wells. In some embodiments, a machine-learning model includes a neural network that includes at least one hidden layer, at least one neuron, and an activation function, where the neural network determines a predetermined amount of carbon dioxide emissions associated with providing electric power to one or more wells to achieve a predetermined production rate. In some embodiments, a machine-learning model includes one or more non-linear autoregressive neural network with an exogenous input (NARX) models. In some embodiments, a request is obtained from a user device to determine carbon dioxide supplies within a carbon dioxide management network in response to a user input to the user device. In some embodiments, reservoir data include sensor data that describes gas content in a reservoir based on one or more gas tracers. In some embodiments, predicted production data for a production well for a predetermined period of time is determined using a machine-learning model and based on historical injection data, where the predicted production data corresponds to a predetermined amount of oil, a predetermined amount of gas, and a predetermined amount of water that are produced by a production well. In some embodiments, error data is determined based on a mismatch between predicted production data and acquired production data. A machine-learning model is updated using the error data and a machine-learning algorithm, where the machine-learning algorithm is a backward propagation algorithm. In some embodiments, predicted carbon emission data is determined using a machine-learning model for a predetermined period of time based on well data for the production well, historical injection data, and historical electric-power data, where the predicted carbon emission data corresponds to electric-power requirements for the production well that achieve carbon dioxide neutrality with a stimulation operation for the geological region of interest. In some embodiments, predicted carbon dioxide demand data is determined using a machine-learning model for an $sCO_2$ turbine for a predetermined period of time based on historical electric-power data. In some embodiments, one or more $sCO_2$ turbines operate using carbon dioxide in a fluid state of carbon dioxide ($CO_2$) that is held at or above a predetermined critical temperature and a predetermined critical pressure.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using artificial intelligence and machine learning to optimize fluid injection (e.g., such as carbon dioxide or water) for enhancing a reservoir while also optimizing carbon emissions. For example, sustainable reservoir management may be implemented while enhancing reservoir performance by recycling carbon emissions from production wells for use in injection wells and supercritical carbon dioxide ($CO_2$) turbines. More specifically, supercritical $CO_2$ power turbines may allow for the efficient utilization of $CO_2$ for electric power generation purposes to avoid the consumption of $CO_2$ emitting alternatives. Accordingly, some embodiments use a machine-learning framework may be used for reservoir performance and turbine optimization as well as reducing the carbon footprint of various hydrocarbon production facilities. Using various data analyses and categorizations, the machine-learning framework may include a multi-factor nonlinear autoregressive neural network with exogeneous inputs (NARX) model that is trained to forecast reservoir production and carbon dioxide consumption by supercritical $CO_2$ power turbines. Likewise, one or more NARX models may be used to manage carbon footprints based on production operations and stimulation operations. By predicting hydrocarbon production and carbon emission data, various well operations (e.g., stimulation operations) may be adjusted to minimize an aggregate carbon footprint from a reservoir while also maximizing reservoir performance.

Figure 1:
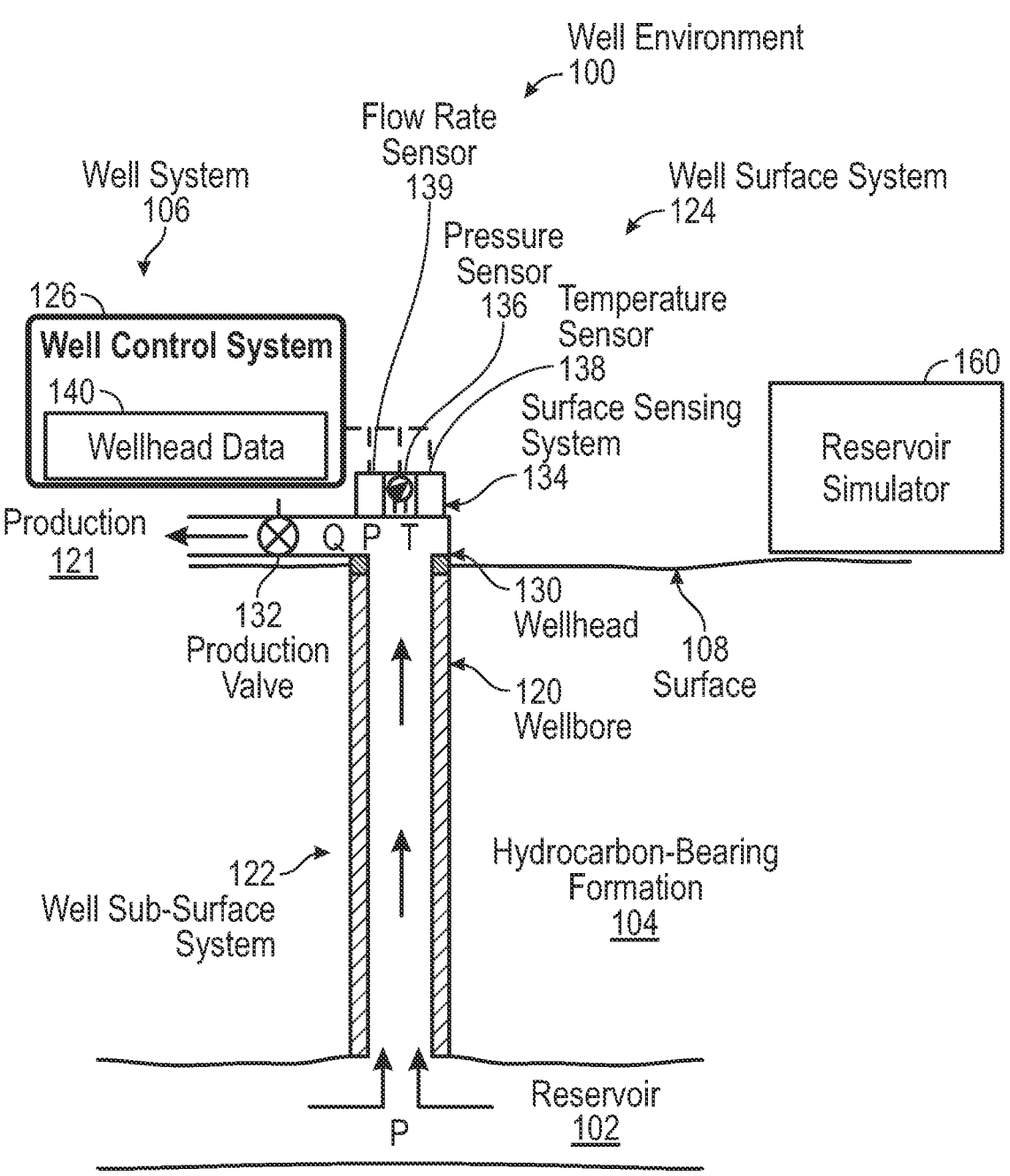
FIGS. 1, 2, and 3 show systems in accordance with one or more embodiments.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying properties, such as varying degrees of permeability, porosity, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system (502) described below in FIG. 5 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) ($Q_{wh}$) passing through the wellhead (130).

In some embodiments, the well system (106) includes a reservoir simulator (160). For example, the reservoir simulator (160) may include hardware and/or software with functionality for generating one or more reservoir models regarding the hydrocarbon-bearing formation (104) and/or performing one or more reservoir simulations. For example, the reservoir simulator (160) may store well logs and data regarding core samples for performing simulations. A reservoir simulator may further analyze the well log data, the core sample data, seismic data, and/or other types of data to generate and/or update the one or more reservoir models.

While the reservoir simulator (160) is shown at a well site, embodiments are contemplated where reservoir simulators are located away from well sites. In some embodiments, the reservoir simulator (160) may include a computer system that is similar to the computer system (502) described below with regard to FIG. 5 and the accompanying description.

Figure 2:
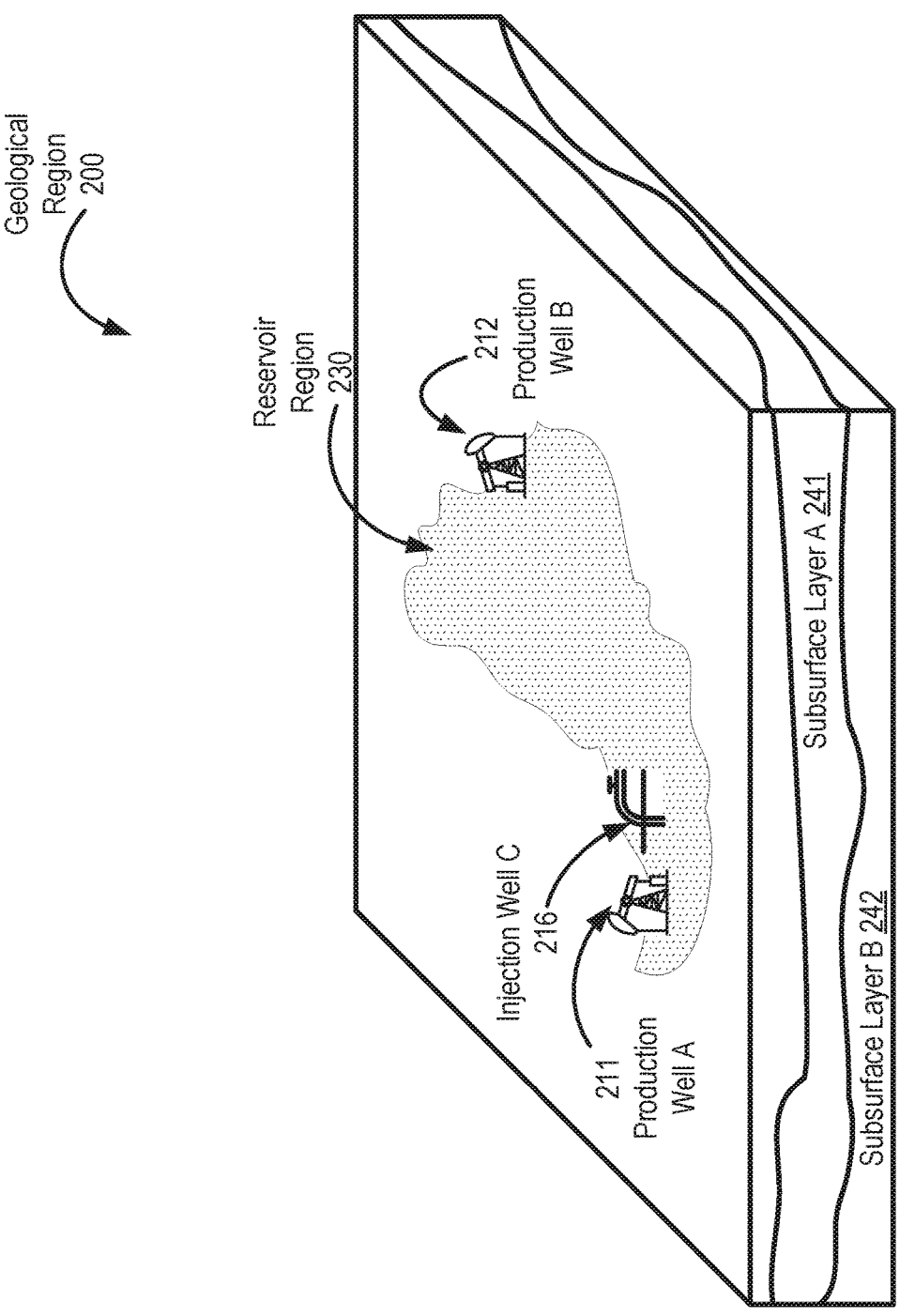

Turning to FIG. 2, FIG. 2 shows a schematic diagram in accordance with one or more embodiments. As illustrated in FIG. 2, FIG. 2 shows a geological region (200) that may include one or more reservoir regions (e.g., reservoir region (230)) with various production wells (e.g., production well A (211), production well (212)). For example, a production well may be similar to the well system (106) described above in FIG. 1 and the accompanying description. Likewise, a reservoir region may also include one or more injection wells (e.g., injection well C (216)) that include functionality for enhancing production by one or more neighboring production wells. As shown in FIG. 2, wells may be disposed in the reservoir region (230) above various subsurface layers (e.g., subsurface layer A (241), subsurface layer B (242)), which may include hydrocarbon deposits. In particular, production data and/or injection data may exist for a particular well, where production data may include data that describes production or production operations at a well, such as wellhead data (140) described in FIG. 1 and the accompanying description.

In some embodiments, production wells and/or injection wells are used in one or more stimulation operations. For example, one type of stimulation operation is a water-alternating-gas (WAG) operation. A WAG operation may be a cyclic process of injecting water followed by gas. Using a WAG injection, macroscopic or microscopic sweep efficiency may be improved for a reservoir, e.g., by maintaining nearly initial high pressure, slow down any gas breakthroughs, and reduce oil viscosity. Likewise, WAG injections may also decrease residual oil saturation resulting from three phase flows and effects associated with relative permeability hysteresis. Thus, some stimulation operations may produce gas flooding, which is a type of enhanced oil recovery (EOR) method for increasing recovery of light to moderate oil reservoirs. In some stimulation operations, water may be injected during the initial phase of the operation and followed by a gas (e.g., carbon dioxide) because water may have a higher mobility ratio than the injected gas, thereby preventing breakthroughs in the reservoir. Injected gas may be a mixture of hydrocarbon gas or nonhydrocarbon gases. With hydrocarbon gases, the gas mixture may include methane, ethane, and propane for achieving a miscible or immiscible gas-oil system in the reservoir. With nonhydrocarbon gases, the gas mixture may include carbon dioxide ($CO_2$), nitrogen ($N_2$), and some exotic gases that displace fluid in the reservoir. Likewise, gas may also be injected directly into a reservoir, e.g., into the gas cap, to compensate for the reservoir's pressure decline.

Furthermore, a stimulation injection during a stimulation operation may correspond to various injection parameters, such as bank size, cycle time, and a predetermined water-gas ratio (also called a "WAG ratio"). Bank size may refer to a size of sequential banks of fluids (e.g., oil, $CO_2$ and water) formed in the reservoir rock in response to a stimulation operation that migrate from the injection to the production wells. For illustration, a WAG ratio of 1:1 may result in a high oil production for one or more production wells, such as production wells coupled to a miscible reservoir. Based on some reservoir parameters such as oil composition, gas flooding can be carried out in miscible or immiscible conditions. Moreover, different types of stimulation operations may use different stimulation parameters. Examples of different stimulation operations may include: (1) continuous gas injections; (2) WAG injections; (3) simultaneous water-alternating-gas (SWAG) injections; and (4) tapered WAG injections. Different strategies have been developed by the petroleum industry to cope with these conditions.

Figure 3:
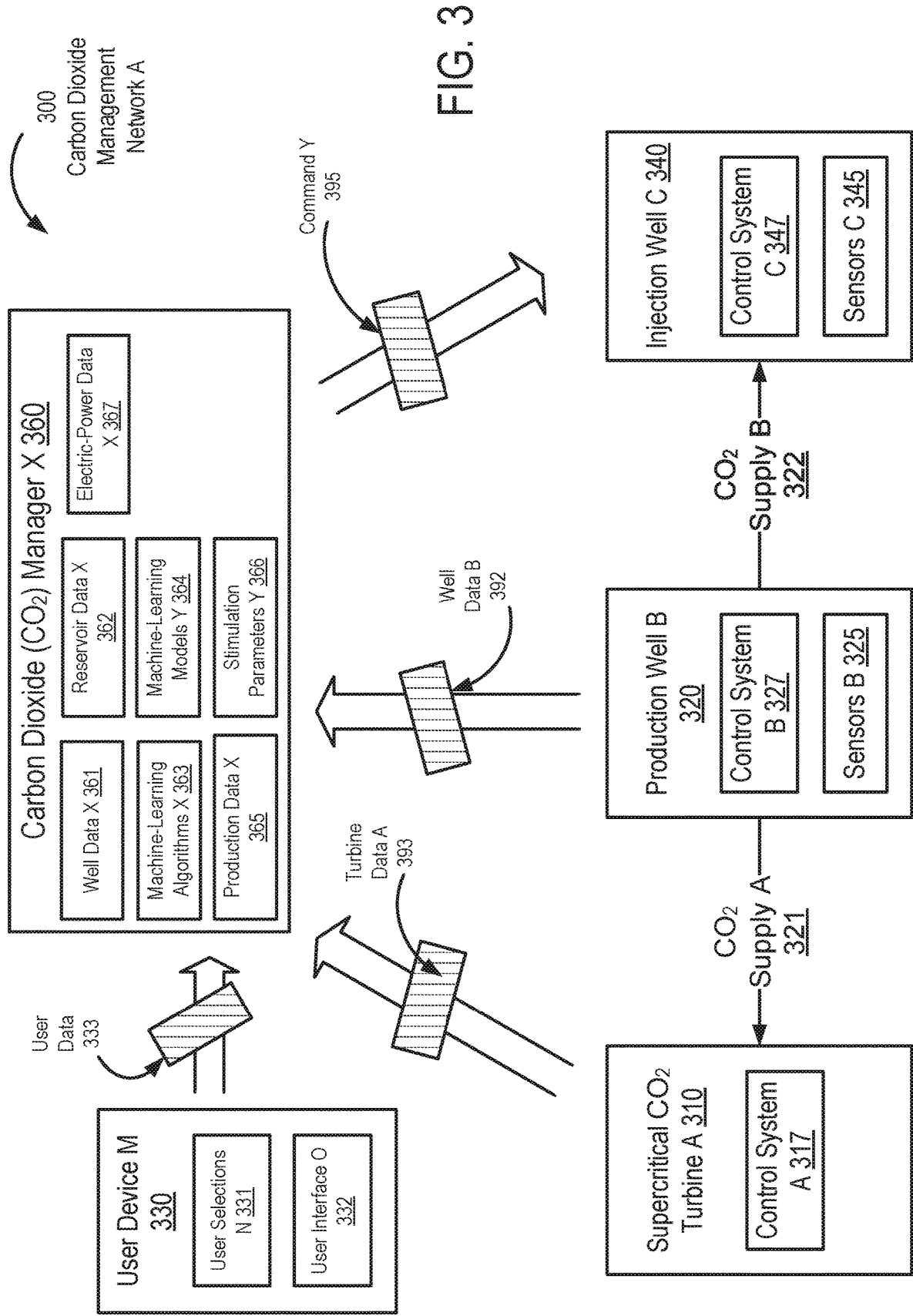

Turning to FIG. 3, FIG. 3 shows a schematic diagram in accordance with one or more embodiments. As shown in FIG. 3, a carbon dioxide management network (e.g., carbon dioxide management network A (300)) may include various well and power-generation facilities (e.g., supercritical $CO_2$ turbine A (310), production well B (320), injection well C (340)), various user devices (e.g., user device M (330)), and various network elements (not shown). The well facilities and power-generation facilities may include various control systems (e.g., control system A (317), control system B (327), control system C (347)), sensor devices (e.g., sensors B (325), sensors C (345)), and other equipment. The carbon dioxide management network A (300) may be similar to network (530) described below in FIG. 5 and the accompanying description. User devices may include personal computers, handheld computer devices such as a smartphone or personal digital assistant, or a human machine interface (HMI). Well equipment and power-generation equipment may include storage tanks, heat exchangers, accumulators, boilers, pumps, inlet separators, coolers, evaporators, instruments, gauges, control switches, valves, emergency stop controls, pressure relief equipment, flaring equipment, smoke detectors, toxic gas detectors, thermal detectors, combustible gas detectors, electric power generators, turbines, exhaust fans, light panels, fume scrubbers, safety showers, and plant equipment.

In some embodiments, a carbon dioxide manager includes hardware and/or software with functionality for managing one or more carbon dioxide supplies (e.g., carbon dioxide supply A (321), carbon dioxide supply B (322)) within a carbon dioxide management network. For example, the carbon dioxide manager may control carbon emissions relating to electric-power production or hydrocarbon production using data obtained over the carbon dioxide management network. Data types may include reservoir data (e.g., reservoir data X (362)), such as well data (e.g., well data B (392), well data X (361)) and sensor data (e.g., data collected from sensors B (325) or sensors C (345)), electric-power data for operating well equipment (e.g., electric-power data X (367)), and production data (e.g., production data X (365)), turbine data (e.g., turbine data A (393)), stimulation parameters (e.g., stimulation parameters X (366)), and user data (e.g., user data (333)). Likewise, the carbon dioxide manager may also control carbon dioxide and other gas injections into a reservoir during stimulation operations. In particular, the carbon dioxide manager may determine predicted carbon footprint data, predicted carbon emission data, predicted production data (e.g., in response to a stimulation operation), and/or predicted electric-power data to optimizing hydrocarbon production while minimizing a carbon footprint of components in the carbon dioxide management network.

In some embodiments, for example, a carbon dioxide manager may include one or more machine-learning models (e.g., machine-learning models Y (364)) to determine predicted data. In particular, a carbon dioxide manager may adjust parameters of one or more stimulation operations, production operations, and electric-power generation operations using machine learning. Different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include a support vector machine and multiple neural networks. In some embodiments, the carbon dioxide manager may generate augmented data or synthetic data to produce a large amount of interpreted data for training a particular model.

In some embodiments, various types of machine learning algorithms (e.g., machine-learning algorithms X (363)) may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model (e.g., one of machine-learning models Y (364)).

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of electric-power data, production data, reservoir data such as wellhead data or sensor data), with the output of the recurrent neural network being dependent on past computations (e.g., future production rates at a given production well may be in response to past stimulation operations at one or more injection wells and past production from the respective reservoir). As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks. In some embodiments, a recurrent neural network is trained using a reinforcement learning algorithm such as a deep reinforcement learning algorithm. For more information on reinforcement learning algorithms, see the discussion below.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, a carbon dioxide manager uses one or more nonlinear autoregressive network with exogenous inputs (NARX) models to predict data. For example, a NARX model may be a recurrent dynamic network with feedback connections enclosing several hidden layers of the machine-learning model. The NARX model may be based on a linear ARX model as used in time-series modeling. As such, autoregressive models, such as the NARX model, may obtain one or more time series signals and various exogenous features as inputs, respectively. For example, a NARX model may have only one hidden layer with a delay of one in the model that may allow the NARX model to perform a one-step-ahead prediction. NARX models may be useful for identification of nonlinear systems using a nonlinearity estimator and one or more model regressors. While nonlinearity estimators may act on the designed regressors to predict the model outputs, the model regressors may provide the delayed outputs and delayed inputs.

Keeping with FIG. 3, in some embodiments, a carbon dioxide management network includes one or more supercritical $CO_2$ turbines (e.g., supercritical $CO_2$ turbine A (310)). More specifically, supercritical carbon dioxide ($sCO_2$) may correspond to a fluid state of carbon dioxide, where the supercritical carbon dioxide may be held at or above its critical temperature and critical pressure. While carbon dioxide usually behaves as a gas in air at standard temperature and pressure (STP), carbon dioxide may adopt properties between a gas and a liquid as pressure and temperature increase. Thus, at its supercritical state, carbon dioxide may be nearly twice as dense as steam, thereby allowing the size of turbine system components to be considerably reduced. As such, supercritical $CO_2$ turbines may operate using supercritical carbon dioxide instead of steam, thereby operating with a smaller carbon footprint than a steam-powered turbine. Examples of supercritical $CO_2$ turbines include simple closed-loop Brayton cycle turbines, recuperated closed-loop Brayton cycle turbines, recuperated recompression closed-loop Brayton cycle turbines, semi-closed direct oxyfuel Brayton cycle turbines, as well as other types of turbines.

Furthermore, a carbon dioxide management network includes various sensors coupled to one or more production wells and one or more injection wells. In some embodiments, for example, a reservoir is monitored using point sensors, quasi-distributed sensor networks, and/or distributed sensor networks. Point sensors may monitor a reservoir at discrete points, while a quasi-distributed sensor network may monitor a reservoir at multiple discrete points situated. Likewise, distributed sensing may be used to monitor reservoir parameters continuously along an entire reservoir section, such as along an entire optical fiber in the context of optical fiber sensors (OFS). Using electromagnetic sensors such as OFSes, sensor data may be transmitted using one or more optical channels. In some embodiments, a carbon dioxide management network includes a distributed chemical sensing (DCS) network in one or more wells. For example, optical fiber-based chemical sensors may be enabled through functional chemical sensing coatings (e.g., disposed on the fiber core or cladding), such as metallic films, oxides, and/or polymers.

In some embodiments, a carbon dioxide manager obtains sensor data based on one or more gas tracers applied to a reservoir. For example, gas tracers may be used to monitor and detect carbon dioxide displacement in the subsurface of a geological region. In particular, gas tracers may detect carbon dioxide leakages (e.g., using gas tracers as a fingerprinting tool) to the upper layers in geological regions, thus providing sensor data that describe carbon emissions and other gas emissions from gases injected into a reservoir. Examples of gas tracers may include perfluorocarbons (PFCs), sulfur hexafluoride ($SF_6$), and various noble gases such as He, Ne, Ar, Kr, and Xe. Using various isotopic gas ratios, gas tracers may detect a $CO_2$ anomaly and identify its origin, since gas tracers may produce unique signatures within a reservoir.

In some embodiments, gas tracers are included in an injected $CO_2$ stream during one or more stimulation operations. In other words, injected carbon dioxide may become distinguishable from shallow fluids (e.g., subsea gas seeps) due to its inheritance of the radiogenic signature from a corresponding gas tracer (e.g., high Helium content may produce a unique signature that differentiates the gas mixture from naturally-occurring carbon dioxide). Likewise, the injected $CO_2$ stream may also be used to verify the presence of injected $CO_2$, monitor $CO_2$ leakage and measure reservoir behavior of $CO_2$ under injection (e.g., saturation, fluid mixing, etc.) In other words, injected carbon dioxide may become distinguishable from shallow fluids (e.g., subsea gas seeps) due to its inheritance of the radiogenic signature from the corresponding gas tracer. Furthermore, gas tracer data may be used in both production prediction and carbon emission prediction through analyses of reservoir fluids, shallow groundwater, deep soil, surface emissions, and formation gases. In some embodiments, for example, a gas tracer is extracted through a thermal desorption system and subsequently analyzed in a gas chromatograph with an electron capture detector (GC-ECD).

Turning to control systems, control systems may include a programmable logic controller (PLC), a distributed control system (DCS), a supervisory control and data acquisition (SCADA), and/or a remote terminal unit (RTU). For example, a programmable logic controller may control valve states, fluid levels, pipe pressures, warning alarms, and/or pressure releases throughout a well facility or power-generation facility. In particular, a programmable logic controller may be a ruggedized computer system with functionality to withstand vibrations, extreme temperatures, wet conditions, and/or dusty conditions, for example, around a refinery. A distributed control system may be a computer system for managing various processes at various facilities using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system. Likewise, a control system may be coupled to one or more well devices or electric-power generation devices.

In some embodiments, a user device (e.g., user device M (330)) may communicate with a carbon dioxide manager to manage carbon dioxide emissions, carbon footprints, electric-power generation at one or more power turbines, and/or well production based on one or more user selections (e.g., user selections N (331)). For example, a user may interact with a user interface (e.g., user interface O (332)) to change thresholds for different carbon dioxide levels or production levels, e.g., for carbon footprint and production optimizations. Through user selections or automation, the carbon dioxide manager may provide various reports for different well facilities, power-generation facilities, and other information in a graphical user interface regarding predicted production data, predicted electric-power data, and carbon emission data.

In some embodiments, the carbon dioxide manager includes functionality for transmitting commands (e.g., command Y (395) is transmitted to a control system in injection well C (340)) to one or more user devices and/or control systems to implement a particular production operation, stimulation operation, and/or power-generation operation. For example, the carbon dioxide manager X (360) may transmit a network message over a machine-to-machine protocol to the control system C (347). A command may be transmitted based on a user input or automatically based on changes in production conditions, e.g., after analyzing new reservoir data, electric-power data, and carbon emission data.

While FIGS. 1, 2, and 3 shows various configurations of components, other configurations may be used without departing from the scope of the disclosure. For example, various components in FIGS. 1, 2, and 3 may be combined to create a single component. As another example, the functionality performed by a single component may be performed by two or more components.

Figure 4:
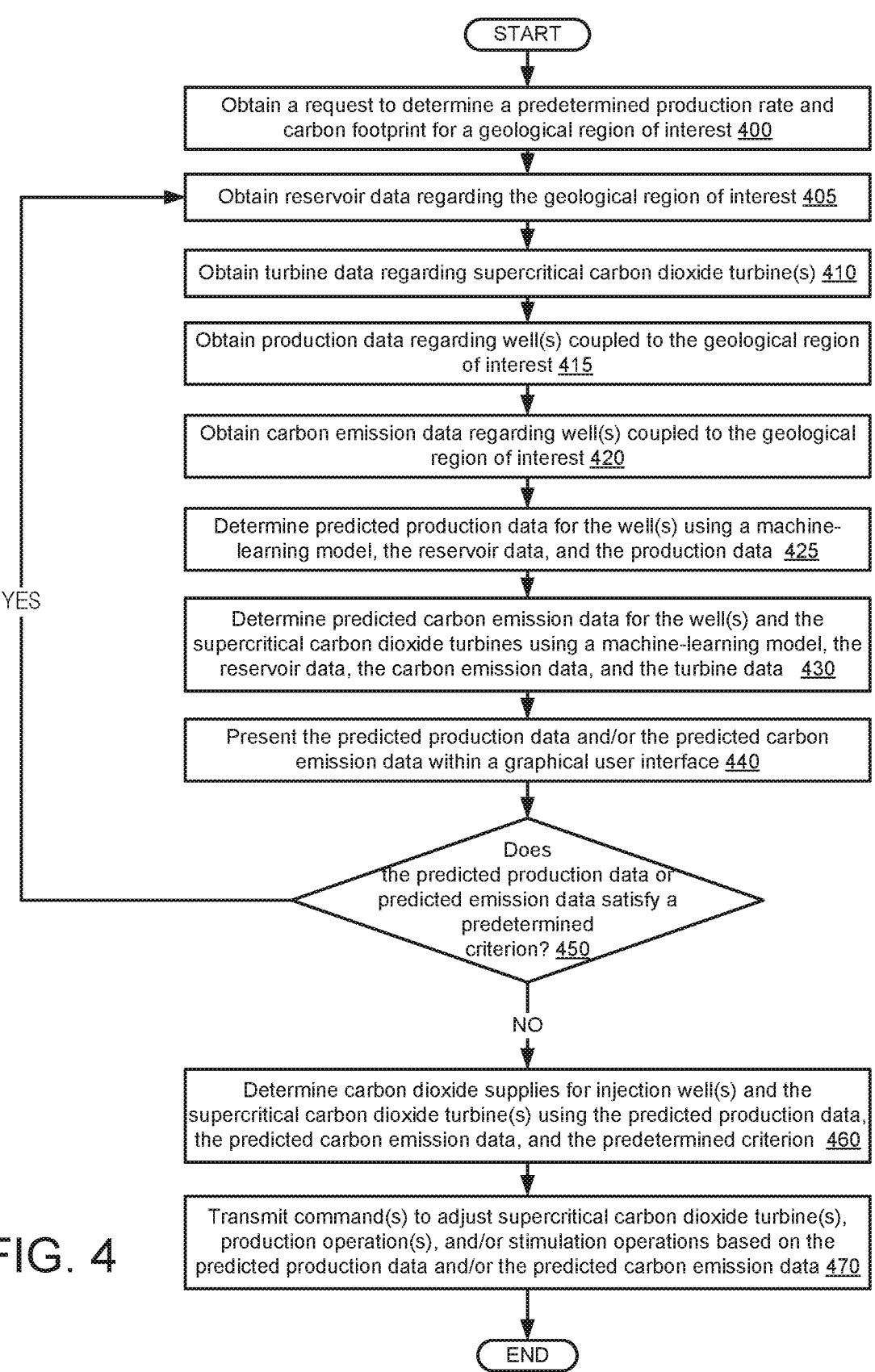
FIG. 4 shows a flowchart in accordance with one or more embodiments.

Turning to FIG. 4, FIG. 4 shows a flowchart in accordance with one or more embodiments. Specifically, FIG. 4 describes a general method for managing stimulation operations and supercritical carbon dioxide turbines based on carbon dioxide emissions and/or optimizing hydrocarbon production. One or more blocks in FIG. 4 may be performed by one or more components (e.g., carbon dioxide manager X (360)) as described in FIGS. 1, 2, and 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, a request is obtained to determine a predetermined production rate and/or a carbon footprint for a geological region of interest in accordance with one or more embodiments. For example, a user may transmit a request in response to a user input provided to a user device. The request may be a network message transmitted between a user device and a carbon dioxide manager that identifies desired production criteria for production wells or desired levels of carbon emissions for one or more wells or well equipment.

In Block 405, reservoir data are obtained for a geological region of interest in accordance with one or more embodiments. For example, reservoir heterogeneity and the adverse effects of $CO_2$ viscosity must be contended with to optimize oil recovery. For example, the reservoir data may include wellhead data, well logs, seismic data, and sensor data. In particular, reservoir data may include a combination of time lapsed gas tracers, resistivity data, chargeability well logs and deep reservoir imaging technologies, such as electromagnetic surveys. In particular, the reservoir data may correspond to changes of volumetric saturation deep into a geological region of interest.

In some embodiments, a carbon dioxide manager may obtain sensor data from inline chromatography-based sensors, e.g., for real-time analysis of tracers, such as gas tracers. In particular, various tracers may be used to qualitatively or quantitatively gauge downhole plume, containment, breakthrough, and reservoir cap rock and top seal integrity monitoring (e.g., in regard to $CO_2$ and other gases) through the reservoir. In some embodiments, tracer surveys may be performed on a geological region of interest through inter-well tests or single well tests. Likewise, tracers may also be used for flow profiling in horizontal well. In flow profiling, different solid gas/water-soluble tracer chips may be disposed along the length of a tubing. Upon gas/water breakthrough, fluid samples may be collected at the surface. In some embodiments, analysis of sensor data from gas tracers may show a qualitative gas-water-inflow profile.

In Block 410, turbine data are obtained regarding one or more supercritical carbon dioxide turbines in accordance with one or more embodiments. For example, turbine data may include operation hours of turbines, electricity utilization, and other information relating to supercritical $CO_2$ turbines, such as related carbon emissions. Likewise, the turbine data may also include power requirements for the operations and the supercritical $CO_2$ turbine power generation capacity.

In Block 415, production data are obtained regarding one or more wells coupled to a geological region of interest in accordance with one or more embodiments. Production data may include well production data, operation hours of turbines, electricity utilization data, and other production data. For the data analysis, a carbon dioxide manager may remove any outlier in the data, and checks for data consistency. In some embodiments, human expert data is used to the enhance the initial data processing and consistency. The initial processed data may thus be categorized different factors or parameters impact on the carbon footprint, where an adapted generalized discriminant analysis may be utilized to determine sensitivity and correlation.

In Block 420, carbon emission data are obtained regarding one or more wells coupled to a geological region of interest in accordance with one or more embodiments.

In Block 425, predicted production data are determined for one or more wells coupled to a geological region of interest using a machine-learning model, reservoir data and production data in accordance with one or more embodiments.

In Block 430, predicted carbon emission data are determined for one or more wells using a machine-learning model, reservoir data, carbon emission data, and turbine data in accordance with one or more embodiments. In some embodiments, the machine-learning model is a NARX model. For example, the NARX model may include hundreds of fully connected layers with one or more activation functions, such as a sigmoid activation function. Input data may be weighted according to an initial categorization and various input features may be evaluated based on their impact on the carbon footprint. The weighting may be also adapted according to various user requirements, and depends on the reservoir conditions.

In Block 440, predicted production data and/or predicted carbon emission data are presented in a graphical user interface in accordance with one or more embodiments.

In Block 450, a determination is made whether predicted production data or predicted carbon emission data satisfy a predetermined criterion in accordance with one or more embodiments. For example, the predetermined criterion may correspond to a predetermined carbon emission levels (i.e., to achieve a predetermined carbon footprint) or predetermined production levels. For example, the predetermined criterion may be selected by a user using a user device, or automatically based on a carbon dioxide manager, e.g., according to one or more optimization algorithms. If current production and carbon emissions satisfy the predetermined criterion, the process may proceed to Block 405 for continued monitoring. If the predicted production data or the predicted carbon emission data fail to satisfy a predetermined criterion, the process may proceed to Block 460.

In Block 460, carbon dioxide supplies are determined for one or more injection wells and one or more supercritical carbon dioxide turbines using predicted production data, predicted carbon emission data, and a predetermined criterion in accordance with one or more embodiments.

In Block 470, one or more commands are transmitted to one or more control systems that adjust one or more carbon dioxide supplies in accordance with one or more embodiments. Using smart/intelligent completions for wells, a carbon dioxide manager may redistribute downhole flow thru various inflow control devices (ICDs), for example, to have an even flow with shut/restrict the zones with the highest water rate. Thus, stimulation operations may be optimized using collected sensor data. Likewise, the carbon dioxide manager may also optimize the amount of $CO_2$ needed for generating electric power by various supercritical $CO_2$ turbines.

Figure 5:
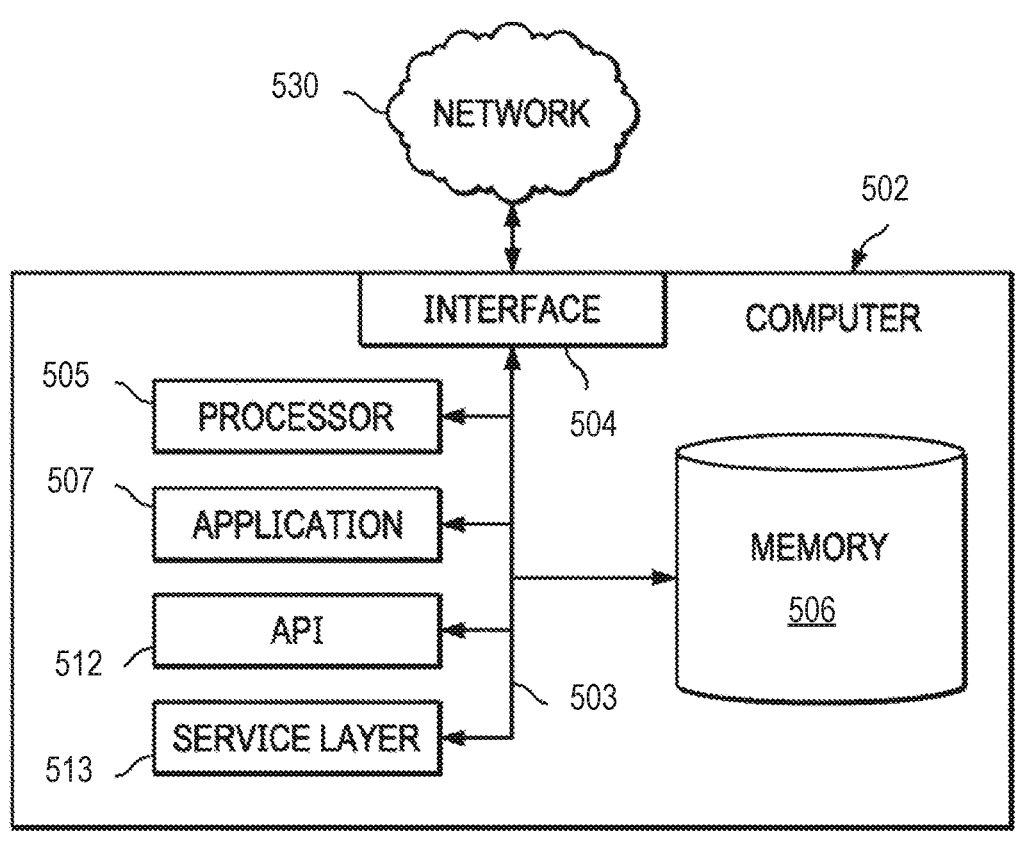
FIG. 5 shows a computer system in accordance with one or more embodiments.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high performance computing (HPC) device, server, desktop computer, laptop/notebook computer, wireless data port, smart phone, personal data assistant (PDA), tablet computing device, one or more computer processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single processor (505) in FIG. 5, two or more computer processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:

performing, using a first injection well, a stimulation operation based on injecting a predetermined amount of carbon dioxide into a subsurface of a geological region of interest, wherein the predetermined amount of carbon dioxide comprises a gas tracer that is used to detect one or more carbon dioxide leakages from the geological region of interest;

obtaining, by a carbon dioxide manager comprising a computer processor and from a plurality of wells in the geological region of interest, gas tracer data for the geological region of interest, wherein the gas tracer data is acquired using a plurality of chromatography-based sensors disposed in the plurality of wells;

obtaining, by the carbon dioxide manager and from a plurality of supercritical carbon dioxide power (sCO2) turbines, turbine data regarding the plurality of sCO2 turbines, wherein the turbine data comprises historical electric-power data for the plurality of $sCO_2$ turbines;

obtaining, by the carbon dioxide manager and from at least one production well among the plurality of wells, acquired production data, wherein the carbon dioxide manager, the plurality of wells, and the plurality of sCO2 turbines are connected over a carbon dioxide management network;

obtaining, by the carbon dioxide manager and over the carbon dioxide management network, carbon emission data for the plurality of wells;

determining, by the carbon dioxide manager, predicted production data and predicted carbon emission data for a production well among the plurality of wells using a first machine-learning model, the gas tracer data, the turbine data, and the carbon emission data; and determining, by the carbon dioxide manager, error data based on a mismatch between the predicted production data and the acquired production data;

updating, by the carbon dioxide manager, the first machine-learning model to produce an updated machine-learning model, wherein the first machine-learning model is updated using the error data and a machine-learning algorithm comprising a backward propagation algorithm;

determining, by the carbon dioxide manager and using the first machine-learning model, predicted carbon dioxide demand data for an $sCO_2$ turbine among the plurality of $sCO_2$ turbines for a period of time based on the historical electric-power data, wherein the first machine-learning model comprises a non-linear autoregressive neural network with an exogenous input (NARX) model, and wherein the NARX model comprises at least one hidden layer and outputs the predicted production data and the predicted carbon dioxide demand data;

transmitting, by the carbon dioxide manager, one or more commands to a control system based on the predicted production data, the predicted carbon dioxide demand data for the $sCO_2$ turbine, and the predicted carbon emission data;

distributing, using the control system and in response to the control system receiving the one or more commands, a flow of carbon dioxide between a second injection well and the $sCO_2$ turbine based on the predicted production data, the predicted carbon dioxide demand data, and the predicted carbon emission data; and generating electric power using the $sCO_2$ turbine and a portion of the flow of carbon dioxide that is distributed to the $sCO_2$ turbine, wherein generating the electric power is performed using a Brayton cycle process, wherein the one or more commands achieve a predetermined production rate at the production well and a predetermined carbon footprint, and wherein the predetermined carbon footprint corresponds to carbon emissions that are produced by the production well and the $sCO_2$ turbine.

2. The method of claim 1, wherein the NARX model determines a predicted production rate at a predetermined time for the production well.

3. The method of claim 1, wherein the NARX model determines an amount of carbon dioxide emissions associated with providing electric power to the production well to achieve the predetermined production rate.

4. The method of claim 1, further comprising:

obtaining, by the carbon dioxide manager and in response to a user input to a user device, a request to determine carbon dioxide supplies within a carbon dioxide management network.

5. The method of claim 1, wherein the predicted production data corresponds to an amount of oil, an amount of gas, and an amount of water that are produced by the production well.

6. The method of claim 1, wherein the predicted carbon emission data corresponds to electric power requirements for the production well that achieve carbon dioxide neutrality with a stimulation operation for the geological region of interest.

7. The method of claim 1, wherein the $sCO_2$ turbine operates using carbon dioxide in a fluid state of carbon dioxide ($CO_2$) that is held at or above a predetermined critical temperature and a predetermined critical pressure.

8. A system, comprising:

a plurality of wells in a geological region of interest, wherein the plurality of wells comprises a production well, a first injection well, and a second injection well;

a plurality of supercritical carbon dioxide ($sCO_2$) turbines;

a first control system coupled to the first injection well;

a second control system coupled to the production well;

a third control system coupled to an $sCO_2$ turbine among the plurality of $sCO_2$ turbines;

a fourth control system coupled to the second injection well;

a carbon dioxide management network; and a carbon dioxide manager comprising a computer processor, wherein the carbon dioxide manager is connected to the first control system, the second control system, the third control system, the fourth control system, and the plurality of wells over the carbon dioxide management network, wherein the first control system is configured to perform, using the first injection well, a stimulation operation based on injecting a predetermined amount of carbon dioxide into a subsurface of the geological region of interest, wherein the predetermined amount of carbon dioxide comprises a gas tracer that is used to detect one or more carbon dioxide leakages from the geological region of interest, wherein the carbon dioxide manager is configured to:

obtain gas tracer data for the geological region of interest from the plurality of wells, wherein the gas tracer data is acquired using a plurality of chromatography-based sensors disposed in the plurality of wells;

obtain turbine data regarding the plurality of $sCO_2$ turbines, wherein the turbine data comprises historical electric-power data for the plurality of $sCO_2$ turbines;

obtain acquired production data from at least one production well among the plurality of wells;

obtain carbon emission data for the plurality of wells;

determine predicted production data and predicted carbon emission data for the production well using a first machine-learning model, the gas tracer data, the turbine data, and the carbon emission data; and determine error data based on a mismatch between first predicted production data and the acquired production data;

update the first machine-learning model to produce an updated machine-learning model, wherein the first machine-learning model is updated using the error data and a machine-learning algorithm comprising a backward propagation algorithm;

determine, using the first machine-learning model, predicted carbon dioxide demand data for the $sCO_2$ turbine for a period of time based on the historical electric-power data, wherein the first machine-learning model comprises a non-linear autoregressive neural network with an exogenous input (NARX) model, and wherein the NARX model comprises at least one hidden layer and outputs the predicted production data and the predicted carbon dioxide demand data; and transmit one or more commands to the third control system based on the predicted production data, the predicted carbon dioxide demand data, and the predicted carbon emission data; and wherein the third control system is configured to:

distribute, in response to the third control system receiving the one or more commands, a flow of carbon dioxide between the second injection well and the $sCO_2$ turbine based on the predicted production data, the predicted carbon dioxide demand data, and the predicted carbon emission data, and generate electric power using the $sCO_2$ turbine and a portion of the flow of carbon dioxide that is distributed to the $sCO_2$ turbine, wherein generating the electric power is performed using a Brayton cycle process, wherein the one or more commands achieve a predetermined production rate at the production well and a predetermined carbon footprint, and wherein the predetermined carbon footprint corresponds to carbon emissions that are produced by the production well, the second injection well, and the $sCO_2$ turbine.

9. The system of claim 8, wherein the NARX model determines a predicted production rate at a predetermined time for the production well.

10. The system of claim 8, wherein the NARX model determines an amount of carbon dioxide emissions associated with providing electric power to the production well to achieve the predetermined production rate, and wherein the second injection well performs a carbon dioxide injection based on the amount of carbon dioxide emissions.

11. The system of claim 8, wherein the $sCO_2$ turbine operates using carbon dioxide in a fluid state of carbon dioxide ($CO_2$) that is held at or above a predetermined critical temperature and a predetermined critical pressure.

* * * * *